United States Patent [19]
Bryant et al.

[11] Patent Number: 6,054,210
[45] Date of Patent: Apr. 25, 2000

[54] MOLDED MAGNETIC ARTICLE

[75] Inventors: Robert G. Bryant, Poquoson; Min Namkung, Yorktown; Russell A. Wincheski, Williamsburg, all of Va.; James P. Fulton, Ballston Lake, N.Y.; Robert L. Fox, Hayes, Va.

[73] Assignee: The United States of America as represented by the Administrator of the National Aeronautics and Space Administration, Washington, D.C.

[21] Appl. No.: 08/846,505

[22] Filed: Apr. 9, 1997

Related U.S. Application Data

[60] Provisional application No. 60/015,154, Apr. 10, 1996.

[51] Int. Cl.[7] ........................................... B32B 5/16
[52] U.S. Cl. ........................................ 428/328; 428/473.5
[58] Field of Search .................................. 428/323, 328, 428/473.5

[56] References Cited

U.S. PATENT DOCUMENTS

| | | | |
|---|---|---|---|
| 4,197,146 | 4/1980 | Frischmann | 148/31.55 |
| 4,592,889 | 6/1986 | Leupold et al. | 419/66 |
| 4,743,507 | 5/1988 | Franses et al. | 428/402 |
| 5,589,010 | 12/1996 | Gay | 148/306 |
| 5,595,609 | 1/1997 | Gay | 148/104 |
| 5,742,223 | 4/1998 | Simendinger, III et al. | 338/21 |

FOREIGN PATENT DOCUMENTS

| | | |
|---|---|---|
| 619584 | 10/1994 | European Pat. Off. . |
| 50-052110 | 5/1975 | Japan . |
| 4-358003 | 12/1992 | Japan . |
| 5-047536 | 2/1993 | Japan . |

OTHER PUBLICATIONS

Hou et al, "Processing and Properties of IM7/LARC–IAX2 Polymide Composites", Journal Adv. Mater, 27(2), 11–18, 1996.

Namkung et al, "Correlation Between Magnetic and Mechanical Properties of Molded Iron Particle Cores", Journal Applied Physics, 81(8, Pt. 2A), 4112–14, 1997.

Hou et al, "Processing and Properties of IM7/LARC–SI Polymide Composites", Institute of Physics Publishing, 9(4), 437–48, 1997.

*Primary Examiner*—Hoa T. Le
*Attorney, Agent, or Firm*—Robin W. Edwards

[57] ABSTRACT

A molded magnetic article and fabrication method are provided. Particles of ferromagnetic material embedded in a polymer binder are molded under heat and pressure into a geometric shape. Each particle is an oblate spheroid having a radius-to-thickness aspect ratio approximately in the range of 15–30. Each oblate spheroid has flattened poles that are substantially in perpendicular alignment to a direction of the molding pressure throughout the geometric shape.

9 Claims, 3 Drawing Sheets

MOLDED MAGNETIC ARTICLE

ORIGIN OF THE INVENTION

Pursuant to 35 U.S.C. §119, the benefit of priority from provisional application Ser. No. 60/015,154, with a filing date of Apr. 10, 1996, is claimed for this non-provisional application.

The invention was jointly made by employees of the United States Government and contract employees during the performance of work under NASA Contract No. NAS-1-20045. In accordance with 35 U.S.C. 202, the contractor elected not to retain title.

BACKGROUND OF THE INVENTION

1. Field of the Invention

This invention relates to molded magnetic materials. More specifically, the invention is a molded magnetic article such as a transformer core and a fabrication method therefor.

2. Description of the Related Art

Power transformers typically make use of magnetic cores made from soft magnetic materials, i.e., materials having a magnetization direction that can be easily changed. Geometric shapes for such cores generally include complex geometric shapes that define a closed path, e.g., a hollow square or rectangular "picture frame" shape, a donut shape, etc. The magnetic cores are generally fabricated from magnetic ingots that mold-set into a desired shape using heat and pressure. Current magnetic core fabrication methods require extremely high pressures (e.g., on the order of 250 kilograms per square inch (ksi) in order to achieve acceptable levels of magnetic induction saturation or $B_{MAX}$ of approximately 13 kilogauss (kG). Such results are best achieved as reported by Speed et al, in "Magnetic Properties of Compressed Powdered Iron", Transaction of American Institute of Electrical Engineers, Volume XL, p. 1321–1359, 1921. However, the application of such high pressures reduces the life of the mold sets thereby raising the production cost of magnetic cores.

SUMMARY OF THE INVENTION

Accordingly, it is an object of the present invention to provide a molded magnetic article and fabrication method therefor.

Another object of the present invention is to provide a molded magnetic article and fabrication method that uses relatively low molding pressures.

Still another object of the present invention is to provide a molded magnetic article having improved mechanical properties.

Yet another object of the present invention is to provide a fabrication method to produce magnetically soft and mechanically strong magnetic cores for use in transformers.

Other objects and advantages of the present invention will become more obvious hereinafter in the specification and drawings.

In accordance with the present invention, a molded magnetic article comprises a plurality of particles of ferromagnetic material embedded in a polymer binder. The particles and polymer binder are molded under pressure into a geometric shape. Each particle is an oblate spheroid having a radius-to-thickness aspect ratio approximately in the range of 15–30. Each oblate spheroid has flattened poles that are substantially in perpendicular alignment to a direction of the molding pressure throughout the geometric shape. In the method of fabrication, a mold defines the geometric shape of the article. The mold is filled with the particles and polymer binder which are heated to a temperature that causes the polymer binder to flow. Pressure is applied to the mixture in the mold in a direction that is perpendicular to a desired axis of magnetization of the article.

DETAILED DESCRIPTION OF THE INVENTION

Figure 1:
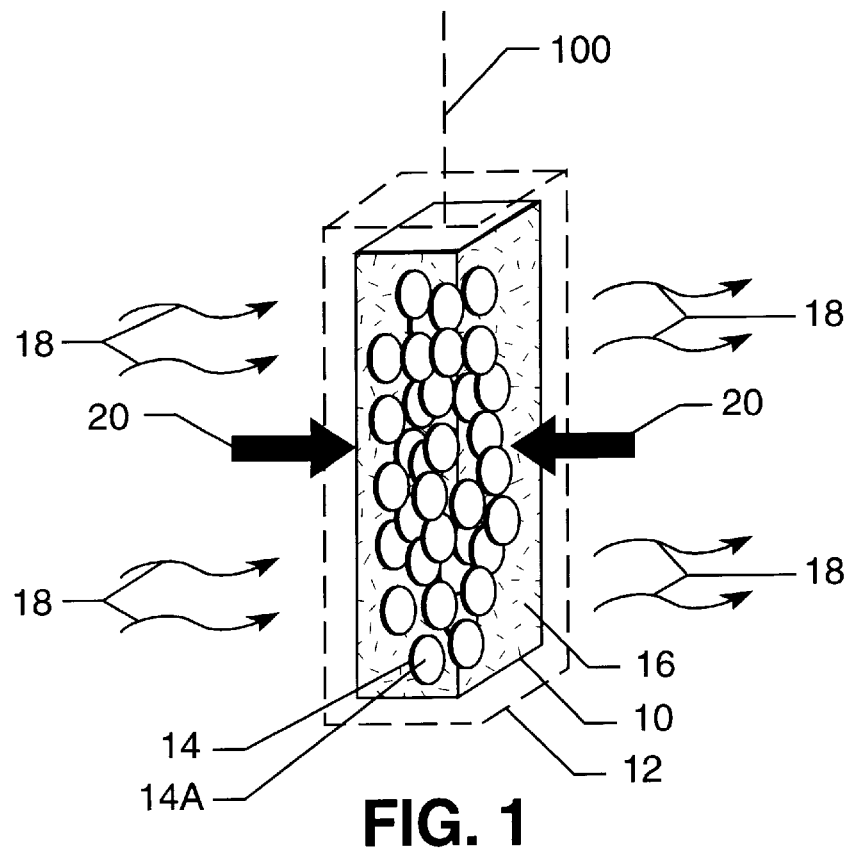
FIG. 1 is a schematic representation of the fabrication process of the present invention used to form a rod-shaped molded magnet.

Referring now to the drawings, and more particularly to FIG. 1, a schematic representation of a fabrication process according to the present invention is shown. By way of example, FIG. 1 will be used to 10 describe the fabrication of a simple molded rod 10 which can be magnetized as either a hard (i.e., permanent) or soft (ie., changeable direction of magnetization) magnet. However, the fabrication process and ultimately formed article resulting therefrom can assume other geometric shapes such as the variety of closed-loop shapes (e.g., a hollow square or rectangular "picture frame" shape, a donut shape, a toroid, etc.) generally used as power transformer cores.

Regardless of shape and/or the hard or soft nature of magnetic article being formed, a mold 12 is provided and is filled with particles 14 of ferromagnetic material (e.g., cobalt, iron, nickel, etc.) and a polymer binder 16. The mixture of particles 14 and polymer binder 16 can be created by coating each of particles 14 with polymer binder 16 as will described further below. Another option is to use uncoated particles 14 mixed with polymer binder 16 provided the volume percentage of polymer binder 16 is approximately 50% or greater.

Figure 2:
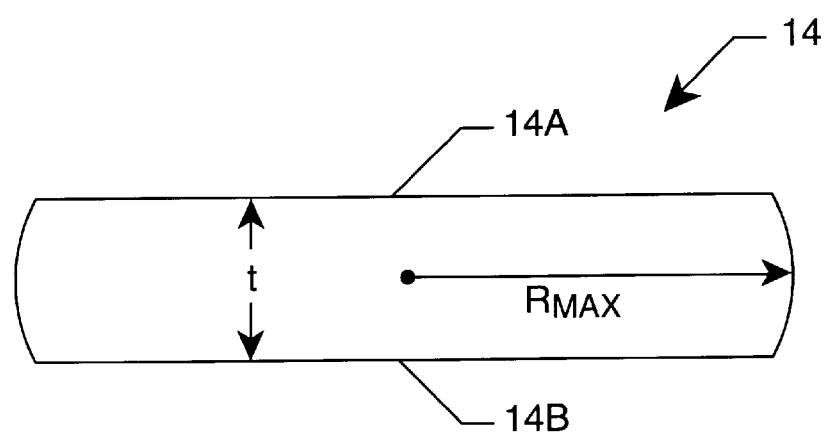
FIG. 2 is a side view of one oblate spheroid shaped particle for describing the aspect ratio thereof in the present invention.

Each of particles 14 is a microscopic-sized particle having a diameter on the order of 100 microns. Each of particles 14 is shaped as an oblate spheroid as shown in the enlargement of one particle 14 in FIG. 2. By definition, an oblate spheroid is defined as having flattened poles. In FIG. 2, the flattened poles are depicted at flat and parallel surfaces 14A and 14B. In terms of the present invention, each oblate spheroid 14 has an aspect ratio in the range of approximately 15–30 where the aspect ratio is defined as the largest radius $R_{MAX}$ of spheroid 14 relative the thickness t of spheroid 14. Ferromagnetic particles meeting these physical criteria are commercially available from, for example, Alfa Aesar, Ward Hill, Mass.

Mold 12 is filled with particles 14 and polymer binder 16 and heated. The applied heat is indicated in the drawings by arrowed wavy lines 18. Heat 18 is applied in sufficient quantity to cause polymer binder to undergo a melt or viscous flow. Accordingly, the particular temperature required in the present invention will vary depending on the polymer binder used. As polymer binder 16 begins to flow, pressure (indicated by arrows 20) is applied to particles 14 and polymer binder 16 via mold 12. Pressure 20 is applied uniaxially in a direction that is perpendicular to a desired direction of magnetization of rod 10. In other words, for the example shown in FIG. 1, it is assumed that the desired direction of magnetization is along the longitudinal axis 100 thereof.

The externally applied pressure 20 aligns oblate spheroids 14 such that all flattened poles (e.g., 14A and 14B) are substantially parallel for all spheroids in the case of a straight rod 10. In general, the flattened poles are substantially perpendicular to the direction of applied pressure 20 experienced within each section of mold 12. This is because applied pressure 20 produces torque which tends to rotate each particle 14 so that faces 14A and 14B tend to align perpendicular to the direction of pressure 20 in each local volume of mold 12. Further, each particle 14 has its easy or preferred axis of magnetization parallel to its flattened poles 14A and 14B. This is because the relatively large aspect ratio used in the present invention minimizes the effects that any demagnetization field can have parallel to the flattened poles. In this way, the present invention causes the individual preferred axis of magnetization of particles 14 to be aligned with the desired axis of magnetization of rod 10, i.e., along the longitudinal axis thereof.

Figure 3:
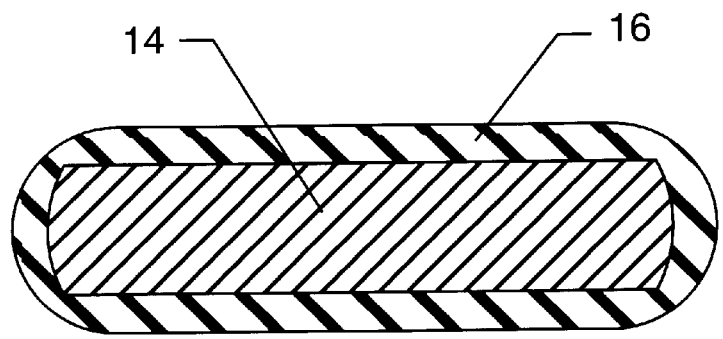
FIG. 3 is a cross-sectional view of one oblate spheroid shaped particle coated with an electrically insulating polymer binder for use in the fabrication of a soft magnet in accordance with the present invention.

If rod 10 is to be used as a soft magnet and particles 14 are electrically conductive, it is desirable to prevent mechanical contact between each of particles 14. One way of achieving this is to coat each particle with the electrically insulating polymer binder 16 prior to filling mold 12. A so-coated particle 14 is shown in cross-section in FIG. 3. There are several methods that can be employed to coat electrically conductive particles with an electrically insulating material. One such method and coating is described in co-pending U.S. patent application entitled, "Tough, Soluble, Aromatic, Thermoplastic Copolyimides", Ser. No. 08/359,752, filed Dec. 16, 1994, and having the same assignee as the instant application, the contents of which are hereby incorporated by reference. Briefly, the aromatic soluble imide described in the afore-mentioned patent application is a thermoplastic copolyimide prepared by reacting 4,4'-oxydiphthalic anhydride with 3,4,3',4'-biphenyltetracarboxylic dianhydride and 3,4'-oxydianiline. Use of this aromatic soluble imide is particularly advantageous because once the drying temperature is above the coating softening point, the coating becomes insoluble while remaining thermoplastic. Thus, multiple coats of the polymer can be applied to particles 14 without removing a previous coating layer prior to consolidation. The multiple-coating capability provides the necessary assurance that all particles 14 are adequately coated with polymer binder 16. Further, if necessary, thick coatings of polymer binder 16 can be applied to particles 14.

The molded magnetic article and fabrication method of the present invention could also make use of other high-performance polymer binders for metals (particularly iron) as disclosed in U.S. Pat. Nos. 5,063,011, 5,198,137 and 5,225,459.

These patents outline several procedures for coating metallic particles with thermoplastics and pressing them to form tough green metallic ingots which are particularly useful in magnetic components.

Figure 4:
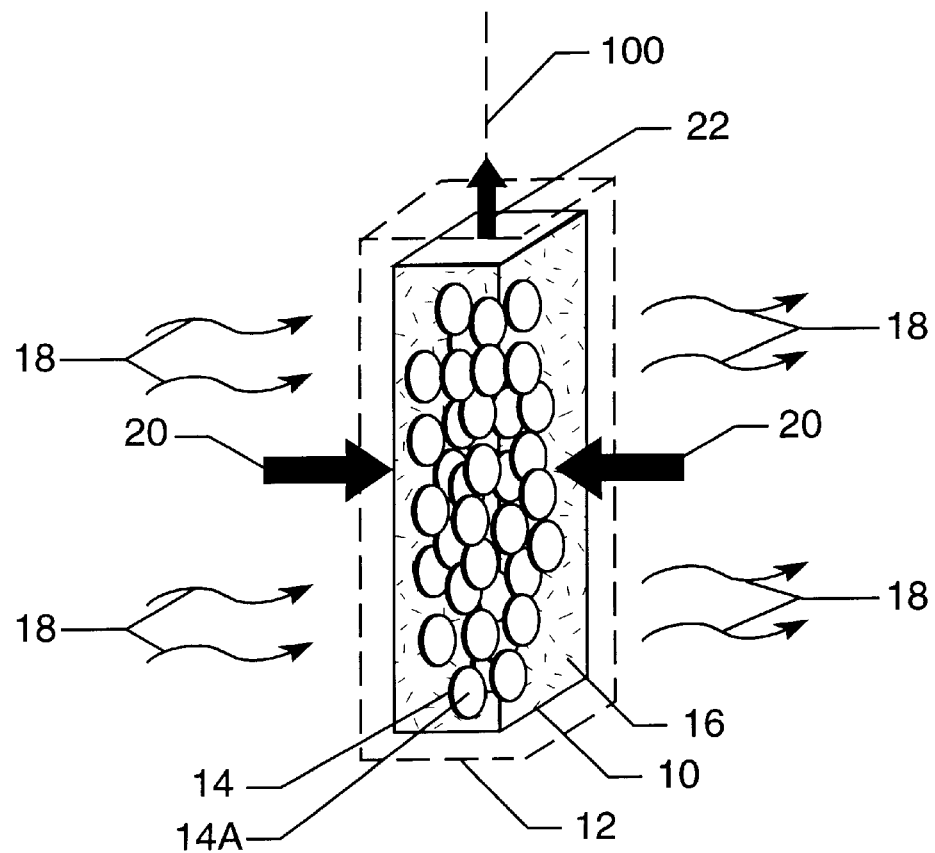
FIG. 4 is a schematic representation of the fabrication process that further includes the step of applying a magnetic field to help align the particles along the desired direction of magnetization of the molded article.
Figures 5A, 5B:
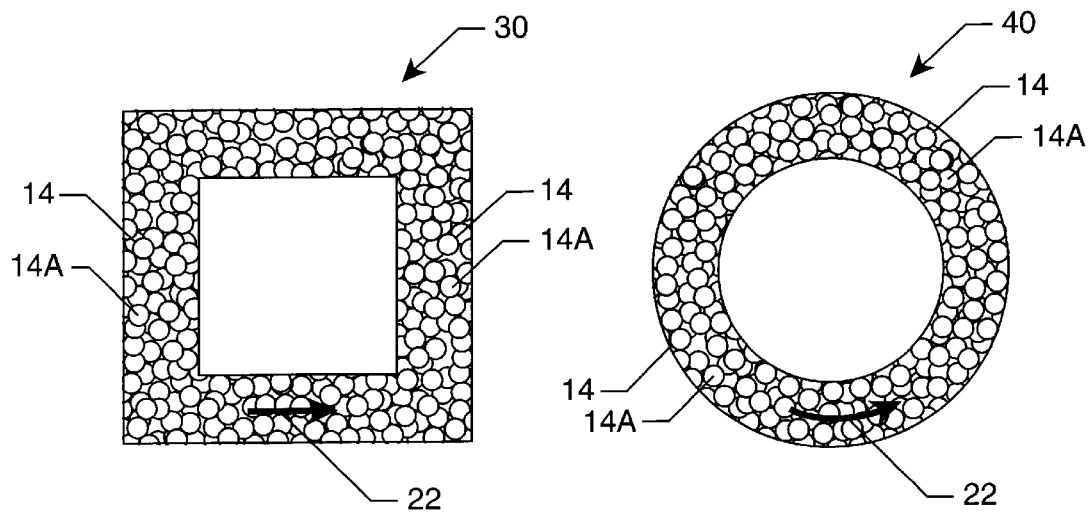
FIG. 5A is a planar view of one embodiment of a "picture frame" shaped transformer core in accordance with the present invention.
FIG. 5B is a planar view of one embodiment of a donut-shaped transformer core in accordance with the present invention.

If it is found that pressure 20 alone does not produce sufficient alignment of particles 14 as described above (i.e., the magnet strength along the desired axis of magnetization of rod 10 is not as great as expected), the fabrication method of the present invention can include the step of applying a magnetic field to help properly align particles 14. This situation is depicted in FIG. 4 where a magnetic field (represented by arrow 22) is applied or induced in rod 10 in a direction that is parallel to the desired direction of magnetization of rod 10. Accordingly, in the illustrated example, magnetic field 22 is parallel to longitudinal axis 100 of rod 10. The application of magnetic field 22 can occur prior to or during the application of heat 18 and pressure 20.

Figures 6A, 6B:
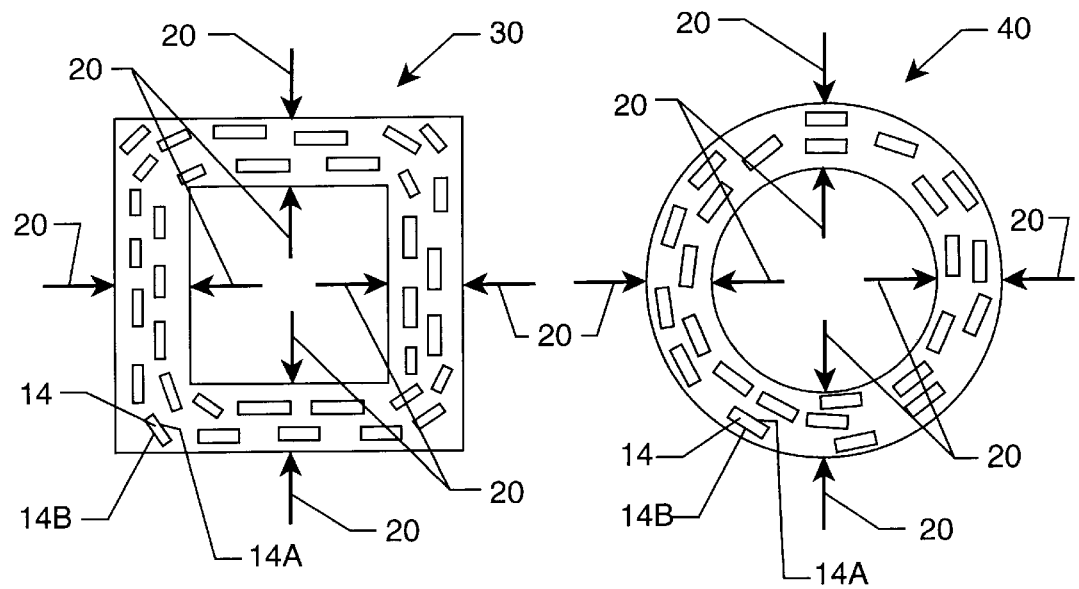
FIG. 6A is a planar view of an alternative embodiment "picture frame" shaped transformer core.
FIG. 6B is a planar view of an alternative embodiment donut shaped transformer core.

As mentioned above, the fabrication process of the present invention can be used to make soft-magnet transformers cores that involve a variety of closed-loop shapes. Several such transformer cores are depicted in FIGS. 5A, 5B, 6A and 6B. In the embodiments in FIGS. 5A and 5B, a "picture frame" shaped core 30 and donut shaped core 40 are depicted, respectively. If the desired direction of magnetization is in the plane of the paper, the direction of applied pressure is perpendicular to the plane of the paper. This will align particles 14 such that their flattened poles are parallel to the plane of the paper throughout the entire geometric shape. If necessary, applied magnetic field 22 could be induced about the closed-loop path defined by each of cores 30 and 40 in order to help with alignment of particles 14. In the embodiments depicted in FIGS. 6A and 6B, it is assumed that the desired direction of magnetization is perpendicular to the plane of the paper. In FIGS. 6A and 6B, applied pressure 20 causes particles 14 to be aligned such that their flattened poles (e.g., faces 14A and 14B) are perpendicular to the plane of the paper throughout the entire geometric shape.

The molded magnetic articles fabricated in accordance with the present invention exhibit significant resistance to bending moments applied perpendicular to the aligned flattened poles of the particles. This is especially true when the particles are made from a rigid ferromagnetic material, e.g., iron, since each oblate spheroid resists bending moments perpendicular to the flattened poles thereof.

The advantages of the present invention are numerous. Acceptable levels of magnetic saturation having been achieved for a variety of molded magnetic articles utilizing molding pressures of less than 20 ksi. Such reduced molding pressures will increase the life of mold sets and therefore reduce the overall cost of molded magnetic article manufacture. The fabrication method can be used to make hard or soft magnets in a variety of simple or complex geometries. The fabrication process is well-suited to the manufacture of soft-magnet transformer cores. The process is simple and can be implemented with current molding equipment.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A molded magnetic article comprising a plurality of particles of ferromagnetic material embedded in a polymer binder, said plurality of particles embedded in said polymer binder being molded under pressure into a geometric shape, each of said plurality of particles being an oblate spheroid having a radius-to-thickness aspect ratio approximately in the range of 15–30, each said oblate spheroid having flattened poles wherein said flattened poles of said plurality of particles are substantially in perpendicular alignment to a direction of said pressure throughout said geometric shape.

2. A molded magnetic article as in claim 1 wherein said ferromagnetic material is an electrically conductive material.

3. A molded magnetic article as in claim 1 wherein said polymer binder is an aromatic soluble imide binder.

4. A molded magnetic article as in claim 3 wherein said aromatic soluble imide binder is a thermoplastic copolyimide.

5. A molded magnetic article as in claim 4 wherein said thermoplastic copolyimide is generated from a reaction of 4,4'-oxydiphthalic anhydride with 3,4,3',4'-biphenyltetracarboxylic dianhydride and 3,4'-oxydianiline.

6. A molded magnetic article as in claim 1 wherein said ferromagnetic material is selected from the group consisting of cobalt, iron and nickel.

7. A molded magnetic article as in claim 1 wherein said geometric shape is a straight rod.

8. A molded magnetic article as in claim 1 wherein said geometric shape defines a closed-loop shape.

9. A molded magnetic article as in claim 1, wherein said perpendicular alignment of said flattened poles of each said oblate spheroid is uniaxial compressive stress-induced, said uniaxial compressive stress induced by pressure applied substantially perpendicular to said flattened poles.

* * * * *